(12) United States Patent
Gaiser et al.

(10) Patent No.: US 6,539,910 B1
(45) Date of Patent: Apr. 1, 2003

(54) CLOSED GALLERY PISTON HAVING CON ROD LUBRICATION

(75) Inventors: Randall R. Gaiser, Chelsea, MI (US); Carmo Ribeiro, Ann Arbor, MI (US); Eduardo H. Matsuo, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/957,704

(22) Filed: Sep. 19, 2001

(51) Int. Cl.[7] .............................................. F01B 31/08
(52) U.S. Cl. .................................................. 123/193.6
(58) Field of Search .......................... 123/193.6, 41.35; 92/186, 238

(56) References Cited

U.S. PATENT DOCUMENTS

| | | |
|---|---|---|
| 4,011,797 A | 3/1977 | Cornet |
| 4,180,027 A | 12/1979 | Taylor |
| 4,270,494 A * | 6/1981 | Garter et al. ............. 123/193.6 |
| 4,331,107 A | 5/1982 | Bruni |
| 4,581,983 A | 4/1986 | Moebus |
| 4,662,319 A | 5/1987 | Ayoul |
| 4,776,075 A | 10/1988 | Kawabata et al. |
| 5,052,280 A | 10/1991 | Kopf et al. |
| 5,144,923 A | 9/1992 | Leites et al. |
| 5,413,074 A | 5/1995 | Horiuchi |
| 5,483,869 A | 1/1996 | Bock et al. |
| 5,778,533 A | 7/1998 | Kemnitz |
| 5,794,582 A | 8/1998 | Horiuchi |
| 5,913,960 A | 6/1999 | Fletcher-Jones |
| 5,934,174 A | 8/1999 | Abraham, Sr. et al. |
| 5,979,298 A | 11/1999 | Whitacre |
| 6,003,479 A | 12/1999 | Evans |
| 6,032,619 A | 3/2000 | Zhu et al. |
| 6,152,016 A | 11/2000 | Bahr et al. |
| 6,286,414 B1 * | 9/2001 | Kruse ........................... 92/186 |
| 6,327,962 B1 * | 12/2001 | Kruse ........................... 92/186 |

* cited by examiner

*Primary Examiner*—Marguerite McMahon
(74) *Attorney, Agent, or Firm*—Reising, Ethington, Barnes, Kisselle, Learman & McCulloch, P.C.

(57) ABSTRACT

A piston for diesel engines includes a piston body having a closed oil gallery and a pair of pin bosses with axially aligned pin bores. The inner faces of the pin bosses are separated from one another by an intervening space between the pin bosses for receiving the upper end of a connecting rod, which has associated outer faces adjacent the inner faces of the pin bosses. Oil passages extend from the gallery and open to the inner faces of the pin bosses for providing direct lubrication to the inner faces.

9 Claims, 3 Drawing Sheets

CLOSED GALLERY PISTON HAVING CON ROD LUBRICATION

BACKGROUND OF THE INVENTION

1. Technical Field

This invention relates generally to pistons for diesel engine applications, and more particularly to those having a closed gallery in the piston body for cooling and lubrication.

2. Related Art

It is common in diesel engine applications to provide a piston having a piston body formed with a closed gallery for cooling oil. The gallery typically is formed just inside the ring belt and beneath the combustion bowl for cooling the upper region of the piston during operation. Oil which is directed into the gallery for cooling is typically diverted out of the gallery through various passages for further cooling and/or lubrication of other regions of the piston, or simply discharged through passages to the interior cavity of the piston where it drains back into the crank case.

In a typical piston assembly, lubrication passages are directed to the cylindrical pin bore surfaces of the pin bosses for lubricating the wrist pin which connects the piston body to the upper end of a connecting rod. There is no direct lubrication provided to the side faces of the connecting rod and pin bosses.

It is an object of the present invention to improve the lubrication of closed gallery pistons for diesel engine applications.

SUMMARY OF THE INVENTION AND ADVANTAGES

A piston for diesel engines constructed according to a presently preferred embodiment of the invention comprises a piston body having an oil gallery and a pair of pin bosses with aligned pin bores. The pin bosses have axially inwardly directed inner faces which surround the pin bores and are separated from one another by an intervening space between the pin bosses for receiving an upper end of a connecting rod. At least one oil passage extends from the gallery and opens to at least one of the inner faces to provide direct lubrication of cooling oil to such surface.

The invention has the advantage of providing a closed gallery piston with direct lubrication of the inner surfaces of the pin bores which interact with corresponding outer faces of the connecting rod. This ensures that these interface surfaces are directly and properly lubricated.

Another advantage of the present invention is that the direct lubrication of the inner pin boss surfaces can be readily achieved by a few added steps in the manufacturing process so as to enable the manufacturer of pistons to include such lubrication without departing substantially from conventional piston making practice.

The invention has the further advantage of prolonging the operating life of the piston, wrist pin, and connecting rods by servicing them with direct lubrication during operation of the engine.

THE DRAWINGS

These and other features and advantages of the present invention will become more readily appreciated when considered in connection with the following detailed description and appended drawings, wherein.

DETAILED DESCRIPTION

Figure 1:
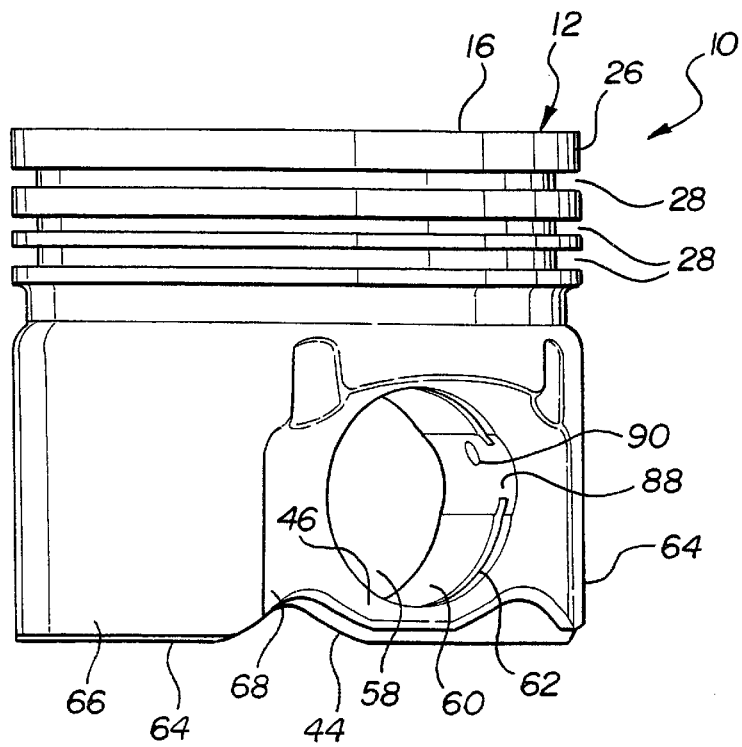
FIG. 1 is an elevational view of a piston constructed according to a presently preferred embodiment of the invention.

A closed gallery piston assembly constructed according to a presently preferred embodiment of the invention is indicated generally at 10 in FIG. 1 and comprises a piston body 12 having an annular top wall 14 with an upper surface 16. A combustion crater or bowl 18 extends into the top wall 14 from the upper surface 16. The top wall 14 has a lower or underside surface 22 opposite the upper surface 16.

The piston body 12 has an outer wall or ring belt 24 that is annular and extends downwardly from the top wall 14. The outer wall 24 has an outer annular peripheral surface 26 formed with a plurality of ring grooves 28. The outer wall 24 includes an inner annular surface 30 spaced radially inwardly from the outer surface 26.

The piston body 12 includes an inner wall 32 projecting downwardly from the combustion bowl 18 and having a radially outwardly facing surface 34 spaced radially inwardly from the inner surface 30 of the outer wall 24.

The piston body 12 has an annular bottom wall 36 which is spaced from the top wall 14 and extends between and interconnects the outer wall 24 and inner wall 32 adjacent their lower ends. The bottom wall 36 has an upper floor surface 38 and lower surface 40.

Figure 2:
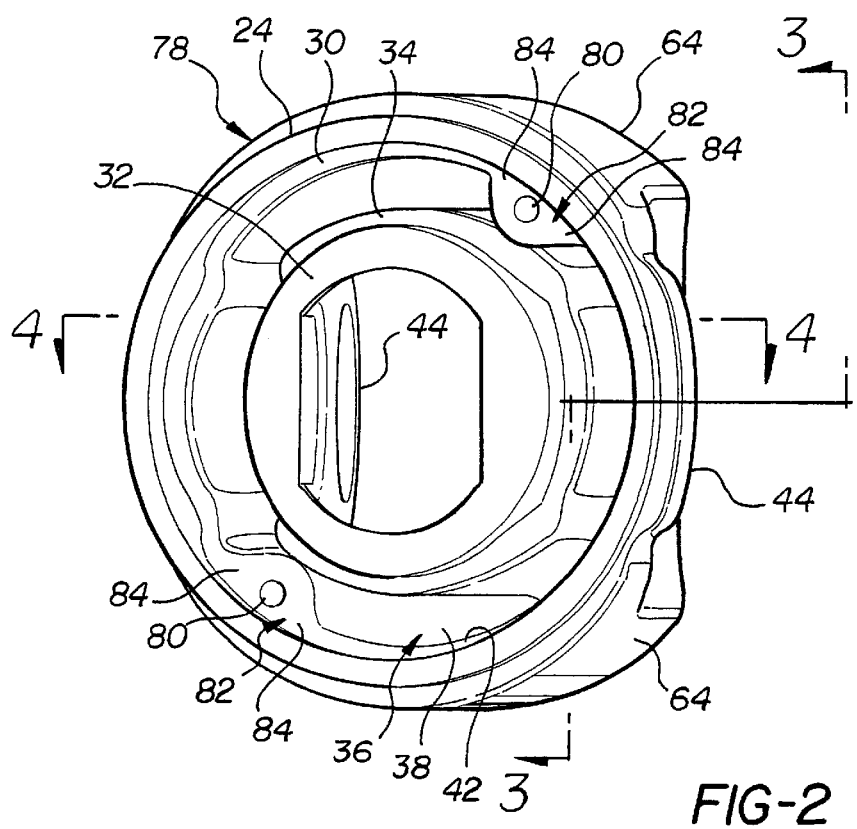
FIG. 2 is a cross-sectional plan view taken along lines 2—2 of FIG. 1.
Figure 3:
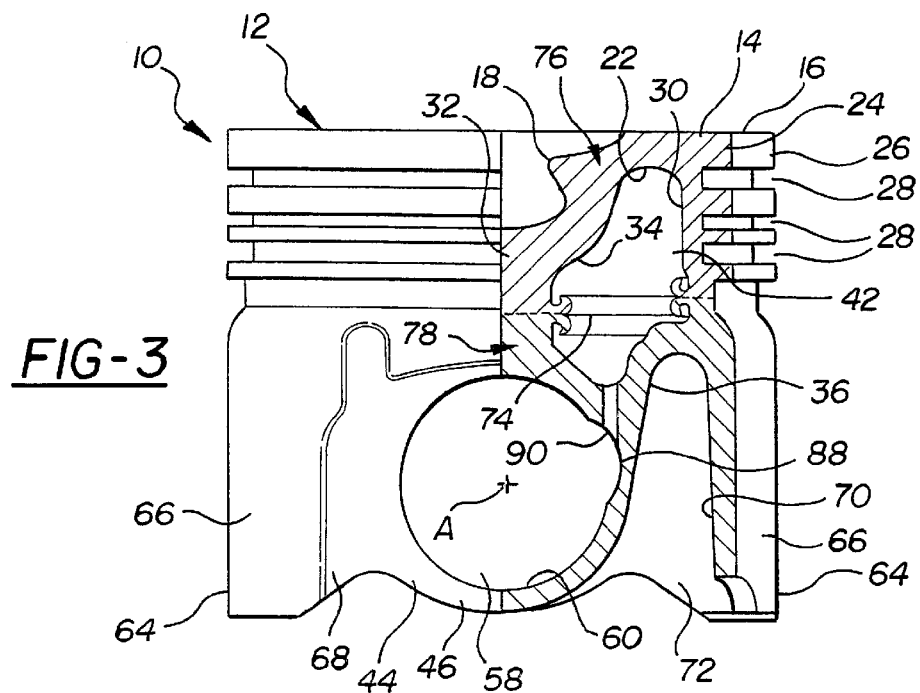
FIG. 3 is a partially sectioned plan view taken generally along lines 3—3 of FIG. 2, but of the entire piston assembly.
Figure 4:
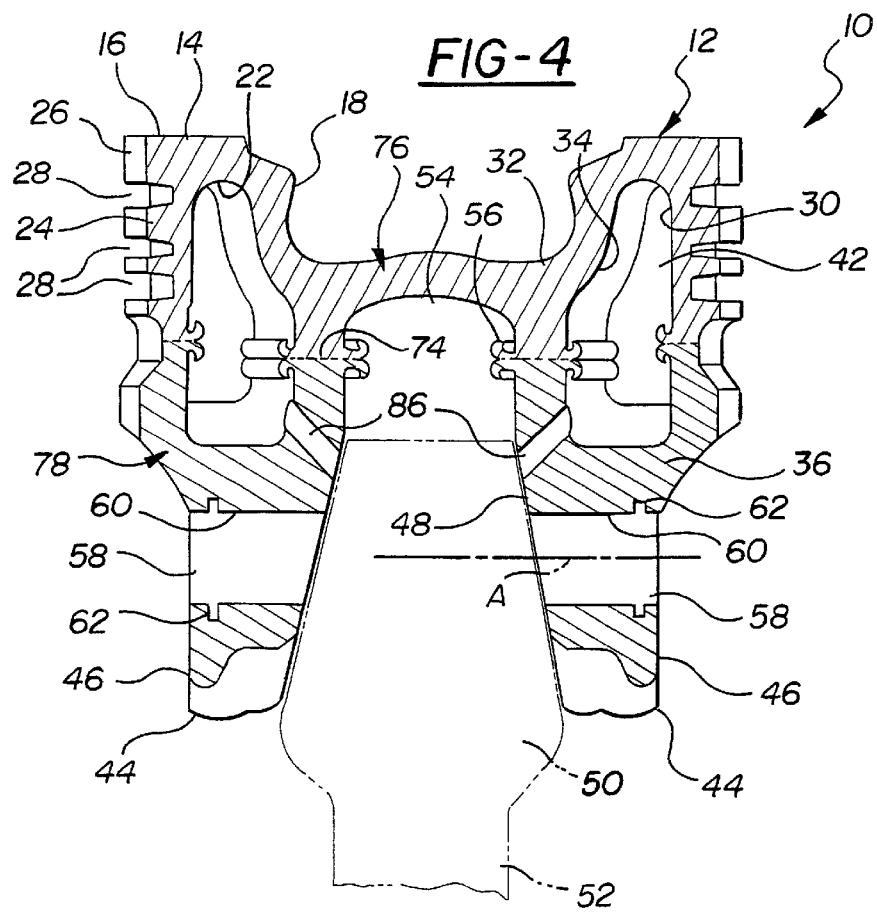
FIG. 4 is a cross-sectional elevation view taken generally along lines 4—4 of FIG. 2, but of the entire piston assembly.

Collectively, the walls 14, 24, 32 and 36 define an interior, annular, ring-like cavity or gallery 42 within the piston body 12 that is closed by the walls. As illustrated in FIGS. 2–4, the gallery 42 extends completely around the piston body 12 and is bounded at the top by the top wall 14, at the bottom by the bottom 36, at the outer periphery by the outer wall 24, and at the inner periphery by the inner wall 32. By "closed" it is meant that the gallery 42 is closed at the bottom by a structural component of the piston body 12, namely the bottom wall 36, which not only extends between but joins the lower ends of the outer wall 24 and inner wall 32. As will be explained further below, various openings and passages are provided to allow cooling oil to circulate into and out of the gallery 42, and thus the term "closed" contemplates the provision of such openings and passages to accommodate the flow of cooling oil through the gallery 42. It will also be appreciated by those skilled in the art that the terms "top", "bottom", "inner" and "outer" in describing the walls are intended and should be construed to represent portions of the surrounding wall structure which enclose the gallery 42 and should not be strictly construed based on the illustrated embodiment shown in the drawings since the particular shape and size of the gallery 42 will likely change from piston to piston depending on the particular cooling requirements necessary for a particular application.

The piston body 12 is further formed with a pair of pin boss portions 44 that are formed and preferably investment cast as one piece with the inner wall 32 and bottom wall 36 from steel. The pin bosses 44 have outer faces 46 that face away from one another and inner faces 48 that face toward one another. The inner faces 48 are each generally planar and preferably divergent toward the bottom of the pin bosses 44, and define a space 50 between the inner faces 48 for accommodating a connecting rod 52 (FIG. 4). A dome or cavity 54 may extend above the space 50, as shown, for cooling the combustion bowl 18. The surfaces which form the cavity 54 extend from, but out of the plane of, the inner faces 48 of the pin bosses 44 and, in the illustrated embodiment, are provided in part by inner surfaces 56 of the inner wall 32. The pin bosses 44 are formed with axially aligned pin bores 58 having pin bore surfaces 60 which are substantially cylindrical and aligned about a pin bore axis A (FIG. 3). The outer and inner faces 46, 48 surround the pin bores 58. The pin bores 58 receive a wrist pin (not shown) which serves to interconnect the piston body 12 with the connection rod 52. The pin bore surfaces 60 provide support to the wrist pin, preferably without the assistance of any bushings, such that the pin bores 58 are preferably bushingless. Each of the pin bores 58 includes an annular snap ring groove 62 for receiving a snap ring to secure the wrist pin (not shown) within the pin bores 58 in usual manner.

The piston body 12 also includes a piston skirt 64. The piston skirt 64 is preferably cast as a single piece with the pin bosses 44, thus providing a monobloc piston structure rather than an articulated skirt. The skirt could, however, be formed as a separate structural component from the piston body 12 and joined through the wrist pin (not shown) in articulated manner to the pin bosses 44, while retaining the closed gallery structure of the piston body 12, but the monobloc structure is preferred. The piston skirt 64 has an outer surface 66 extending between the pin bosses 44 that is substantially in line and forms a extension of the outer surface 26 of the outer wall 24. The outer surface 66 is interrupted across the pin bores 58 to provide recessed side faces 68 where the skirt 64 joins the pin bosses 44. An inner surface 70 of the piston skirt 64 defines a space 72 adjacent the pin bores 58 that is walled off by the skirt 64.

The closed gallery structure of the piston body 12 is preferably achieved by forming the piston body 12 from at least two separate parts which are subsequently joined across a joint or joints 74 to effectively yield a united, one piece body structure once joined. While there are a number of ways to join such separate components, all of which are contemplated by the invention, the preferred approach is to join the separately formed components across a friction weld joint 74, as illustrated in FIGS. 3 and 4. In such case, a top part 76 above the joint 74 is separately formed from a bottom part 78 on the opposite side of the joint 74, and the separately formed parts 76,78 are then friction welded together across the joint 74 to yield the united structure as shown in the drawings. Some examples of other joining techniques that are contemplated include other means of welding, bonding, brazing, screw thread joint, and other mechanical and metallurgical means of uniting the separate components together to yield the closed gallery structure of the piston body 12.

According to a further preferred aspect of the invention, at least the bottom part 78 is investment cast from steel, and the top part 76 may likewise be investment cast from steel or formed by other techniques such as forging or other casting techniques.

Referring now particularly to FIGS. 2 and 5–7, the bottom wall 36 of the piston body 12 is formed with at least one and preferably two oil access holes 80 which extend from the lower surface 40 of the bottom wall 36 within the space 72 into the oil gallery 42. The oil holes 80 preferably are entry ports for introducing cooling oil into the gallery 42. When the piston 10 is installed in a diesel engine, the oil holes 80 communicate with associated oil injection nozzles (not shown) which direct a stream of cooling oil from below up into the space 72 and into the gallery 42 through the holes 80. Once in the gallery 42, the cooling oil serves to cool the upper part of the piston body 12, extracting heat from the walls as the oil is moved about in the gallery 42 with a "cocktail shaker" action during reciprocation of the piston 10.

Figure 6:
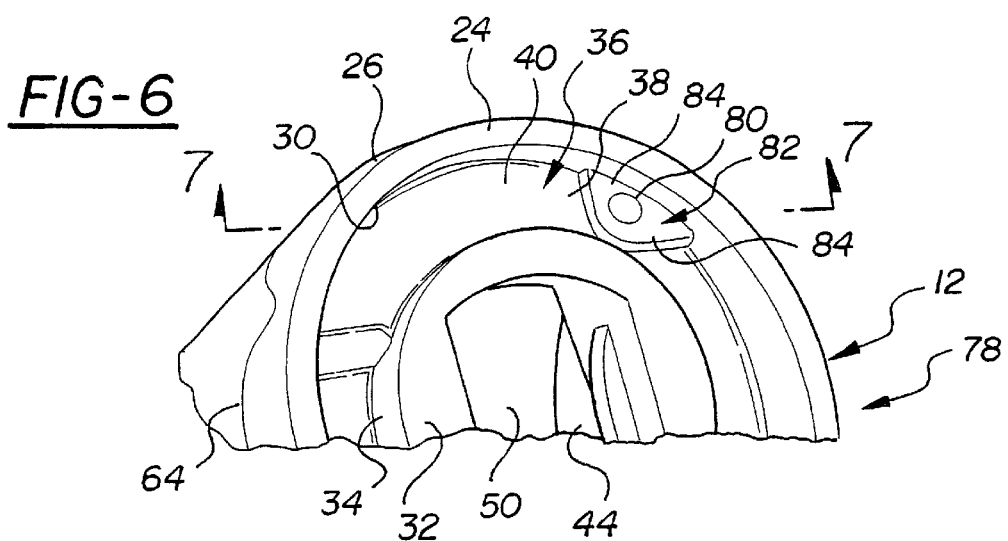
FIG. 6 is a fragmentary top perspective view, with a top portion of the piston removed, as in FIG. 2.
Figure 7:
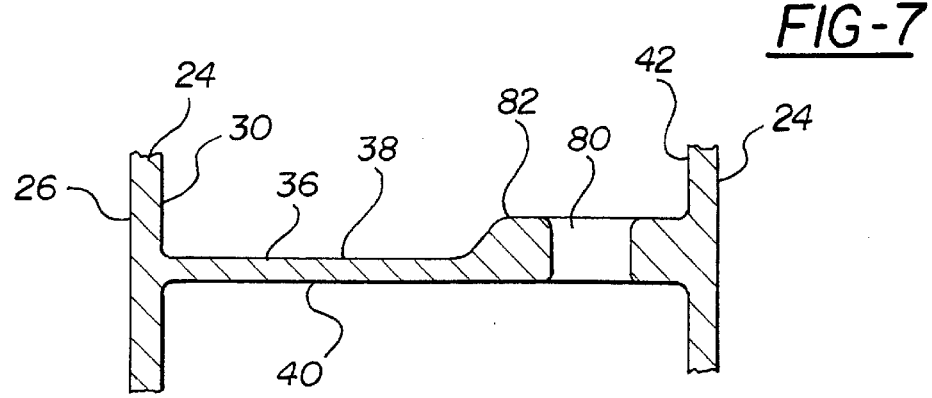
FIG. 7 is a fragmentary cross-sectional view taken generally along lines 7—7 of FIG. 6.

Because of the closed gallery structure of the piston body 12, the combustion forces exerted on the top wall 14 which drive the piston 10 downwardly in the cylinder are transferred to the pin bosses 44 not only through the inner wall 32, but also through the outer wall 24 and interconnecting bottom wall 36. As such, the outer wall 24 and bottom wall 36 serve as structural load-bearing portions of the piston which must withstand the forces of combustion and transfer such loads to the pin bosses 44 without failure. The oil holes 80 and the bottom wall 36 represent an abrupt discontinuity in the bottom wall structure, and thus a potential site for stress concentration and potential failure. The present invention address this problem by reinforcing the piston body structure in the vicinity of the oil holes 80 to counteract the stress concentration effects caused by the introduction of the oil holes 80 in the bottom wall 36. According to the invention, the piston body 12 is formed with oil hole bosses 82 bordering the oil holes 80, which are best shown in FIGS. 2, 6 and 7. The oil hole bosses 82 are defined by localized thickened portions of the bottom wall 36 which immediately border the oil holes 80 in order to give added structural integrity to the bottom wall 36 in the area surrounding the oil holes 80. As illustrated most clearly in FIGS. 6 and 7, the oil hole bosses 82 extend above the upper floor surface 38, such that the thickness of the bottom wall 36 immediately adjacent the oil hole bosses 82 is thinner than that of the portion of the bottom wall 36 making up the oil hole bosses 82. The oil hole bosses 82 preferably extend into and are formed as one piece with the outer wall 24, providing added structural integrity to the transition region between the outer wall 24 and bottom wall 36 in the vicinity of the oil holes 80. It is preferred that all corners of the oil hole bosses 82 are rounded, as illustrated in FIGS. 6 and 7 to reduce stress concentration.

As shown best in FIGS. 2 and 6, the oil hole bosses, when viewed from above in plan, have a non-circular shape and preferably include generally triangular regions or portions 84 where the oil hole bosses 82 join the outer wall 24. It will be appreciated that the particular size and shape of the oil hole bosses 82 will be governed in large part by the structure needed to counteract the stress concentration imparted by the presence of the oil holes 80. One advantage of investment casting the bottom part 78 is that the oil hole bosses 82 can be precisely formed to the net or near net shape needed to provide the desired counteracting structure against stress concentration of the holes 80.

Figure 5:
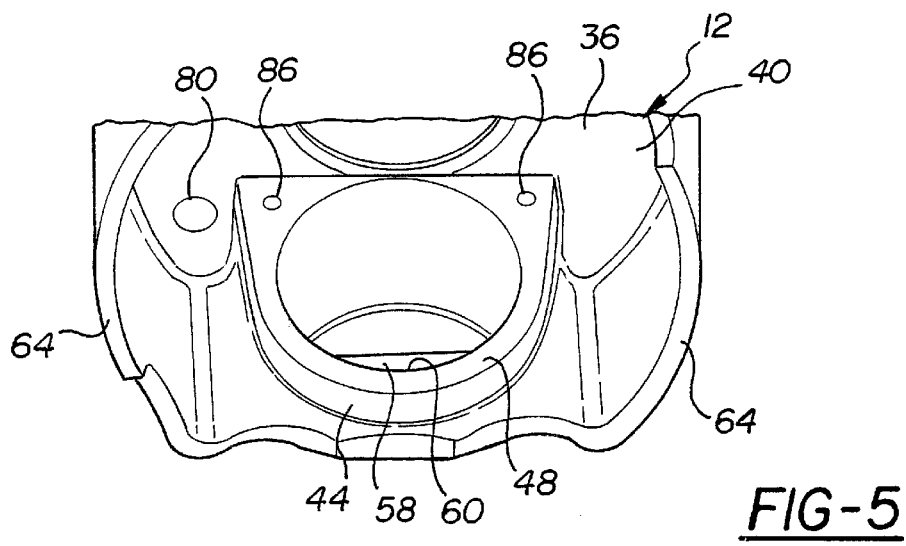
FIG. 5 is a fragmentary bottom perspective view of the piston of FIG. 1.

According to another aspect of the invention, at least one and preferably a pair of passages 86 extend from the gallery 42 directly to the inner faces 48 of the pin bosses 44, so as to provide direct lubrication to the inner faces 48 between the pin bosses 44 and the connection rod 52. The passages 86 are best shown in FIGS. 4 and 5. In the illustrated embodiment, there are thus four such passages 86, two servicing each inner face 48 of the pin bosses 44 on opposite side of the pin bore axis A. The passages 86 are spaced from the walls which form the dome 54 and open directly to the inner faces 48 to provide direct lubrication in the gap between the pin bosses 44 and the connecting rod 52.

According to still a further aspect of the invention and as shown best in FIGS. 1 and 3, the pin bores 58 are formed with an axial recess or pocket 88 which extends axially in the direction of the axis A of the pin bores 58 and presents a discontinuity in the cylindrical pin bore surfaces 60. The recesses 88 are preferably concave and are located at least partly above the center line axis A of the pin bores. The recesses 88 extend axially across the full width of the pin bores 58 and thus are co-extensive with the width of the pin bore surfaces 60 between the outer 46 and inner 48 faces of the pin bosses 44. The recesses 88 are aligned axially with one another and are interrupted by the space 50 between the inner faces 48 of the pin bosses 44, as are the pin bore surfaces 60. The recesses 88 are domeshaped or concave in cross-section when viewed in the direction of the pin bore axis A. An oil passages 90 extends from the gallery 42 and opens directly into each of the recesses 88 so as to feed oil to the recesses 88 during operation of the piston 10 across the full width of the pin bores 58. The oil passages 90 preferably originate from the lowest part of the gallery 42 so as to provide a constant supply of oil to the pin bores 58 during the full cycle of movement of the piston. The entry of the oil passage 90 into the recess 88 is preferably about midway between the outer and inner faces 46, 48 of the pin bosses 44 to promote uniform distribution of oil. The recesses 88 serve as reservoirs or holding pockets for oil and continue to feed oil to the pin bore surfaces 60 during the full stroke of the piston 10 to provide full time uniform lubrication.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A piston for diesel engines, comprising:

a piston body having an oil gallery;

a pair of pin bosses having pin bores aligned about a pin bore axis and axially inwardly directed inner faces surrounding said pin bores and separated from one another by an intervening space between said pin bosses for receiving an upper end of a connecting rod; and at least one oil passage extending from said oil gallery to an opening in at least one of said inner faces of said pin bosses to provide direct lubrication of cooling oil thereto, said opening of said oil passage being below the bottom surface of said oil gallery at the location of said oil passage.

2. The piston of claim 1 including at least one said oil passage extending from said oil gallery to each of said inner surface of said pin bosses.

3. The piston of claim 1 wherein there are two said oil passages extending from said oil gallery to each of said inner faces of said pin bosses.

4. The piston of claim 3 wherein said oil passages associated with each said inner surface are disposed on opposite sides of said pin bore axis.

5. The piston of claim 1 wherein said inner faces are generally planer.

6. The piston of claim 5 wherein said inner surfaces are non-parallel.

7. The piston of claim 6 wherein said inner surfaces diverge away from said oil gallery.

8. The piston of claim 1 wherein said piston body is fabricated of at least two separate parts which are connected across at least one joint to form said oil gallery.

9. The piston of claim 8 wherein said joint comprises a friction weld joint.

* * * * *